United States Patent [19]

Matsuoka et al.

[11] 4,331,304
[45] May 25, 1982

[54] EMERGENCY LOCK TYPE RETRACTOR

[75] Inventors: Hideoki Matsuoka, Yokohama; Yoshimi Yamamoto, Shizuoka, both of Japan

[73] Assignee: Nissan Motor Co., Ltd., Japan

[21] Appl. No.: 184,743

[22] Filed: Sep. 8, 1980

[30] Foreign Application Priority Data

Sep. 12, 1979 [JP] Japan .................. 54-126772[U]

[51] Int. Cl.³ .................. A62B 35/02; B65H 75/48
[52] U.S. Cl. .................................. 242/107.4 A
[58] Field of Search .................. 242/107.4 R–107.4 E; 297/478, 480; 280/806

[56] References Cited

U.S. PATENT DOCUMENTS

| | | | |
|---|---|---|---|
| 3,552,676 | 1/1971 | Weber | 242/107.4 A |
| 3,901,461 | 8/1975 | Stephenson et al. | 242/107.4 A |
| 3,995,788 | 12/1976 | Stephenson et al. | 242/107.4 A |
| 4,090,678 | 5/1978 | Yamanashi | 242/107.4 A |
| 4,193,566 | 3/1980 | Inukai | 242/107.4 A |

Primary Examiner—John M. Jillions
Attorney, Agent, or Firm—Lane, Aitken, Kice & Kananen

[57] ABSTRACT

An emergency lock type retractor for a passive safety belt assembly of a vehicle includes a housing (1) mounted on the vehicle body, a reel (3) for the belt (4) rotatably supported by the housing and a ratchet wheel (7) secured to the reel. An inertia device (16) detects an emergent deceleration of the vehicle and causes a pawl (9) to engage with the ratchet wheel to lock the reel and prevent unwinding of the belt. The inertia device includes a first inertia member (19) perpendicularly suspended by the housing to assume a constant angle with respect to the vehicle body. The first inertia member supports a more sensitive second inertia member (22) which displaces relatively to the first inertia member as the vehicle is emergently decelerated. When the mounting angle of the housing varies with respect to the vehicle body, the first inertia member swings to stably maintain the second inertia member at a constant angular position with respect to the vehicle body.

5 Claims, 4 Drawing Figures

EMERGENCY LOCK TYPE RETRACTOR

The present invention relates to a retractor for a passive safety belt assembly of a vehicle and more particularly, to an improvement in a retractor of the type wherein a sudden acceleration or deceleration, a crash and an inclination of the vehicle is detected by an inertia device to achieve an emergent locking of the belt or to prevent unwinding of the belt from the retractor.

Conventionally, the inertia device includes a single inertia member which is directly supported by the retractor housing and which either consists of a ball or is of the pendulum type. Such a known inertia member is effective at a predetermined mounting angle of the retractor housing with respect to the vehicle body. Thus, it has been considered to be impossible to provide an emergency lock type retractor whose retractor housing is permitted to rotate with respect to the vehicle body as the belt is unwound from the retractor obliquely, while preserving the intended operation of the inertia member. Another disadvantage of the conventional arrangement resides in the fact that, in order to provide the desired function of the inertia member, the design of the retractor housing has to be modified corresponding to various mounting angles of the housing with respect to the vehicle body even when the same inertia member is used. This means that various types of retractors have to be prepared for various vehicles.

An object of the present invention is to provide an improved emergency lock type retractor which can be used for a relatively wide range of the mounting angle of the retractor housing with respect to the vehicle body. Thus, the retractor according to the present invention achieves the desired emergent locking function even when the retractor housing is rotated relatively to the vehicle body at the time of unwinding the belt, or the retractor housing is mounted on the vehicle body at a different angle.

According to the present invention, there is provided an emergency lock type retractor for a passive seat belt assembly of a vehicle including a housing mounted on a vehicle body, a reel rotatably supported by the housing and urged in a direction in which the seat belt is retracted and wound about the reel, a ratchet wheel fixedly secured to the reel, a pawl supported by the housing and normally kept disengaged from the ratchet wheel, and actuating means responsive to acceleration or deceleration of the vehicle, said actuating means establishing an engagement of the pawl with the ratchet wheel when the rate of acceleration or deceleration of the vehicle exceeds a predetermined level so as to prevent unwinding of the belt from the reel, wherein said actuating means comprises:

a first inertia member perpendicularly suspended by the housing and adapted to swing with respect to the housing as the mounting angle of the housing with respect to the vehicle body varies;

a second inertia member which is more sensitive to the acceleration or deceleration of the vehicle than the first inertia member, and which is supported by the first inertia member movably with respect to the first inertia member; and means for transmitting to the pawl the movement of the second inertia member with respect to the first inertia member such that the pawl is displaced into engagement with the ratchet wheel.

With the above arrangement of the present invention, even when the retractor housing is rotated with respect to the vehicle body to follow the unwinding movement of the belt, the first inertia member returns slowly to a stable position where it is directed perpendicularly downwards, thus assuming a constant angle with respect to the vehicle body. Since the first inertia member supports the more sensitive second inertia member, a sudden deceleration or the like of the vehicle is detected as the movement of the second inertia member with respect to the first inertia member, by which the reel is locked to prevent unwinding of the belt. Thus, the retractor according to the present invention effects the desired emergent locking of the belt substantially without being influenced by the mounting angle of the retractor housing. Even when the retractor housing has to be mounted to the vehicle at a different angular position, the first inertia member always provides by its self-stabilizing function an effective operating position of the second inertia member. Thus, a design modification of the retractor for various types of vehicles is not necessary and the retractor according to the present invention can be used as a standardized component.

The present invention will now be described in detail by referring to some preferred embodiments shown in the accompanying drawings, in which.

Figure 1:
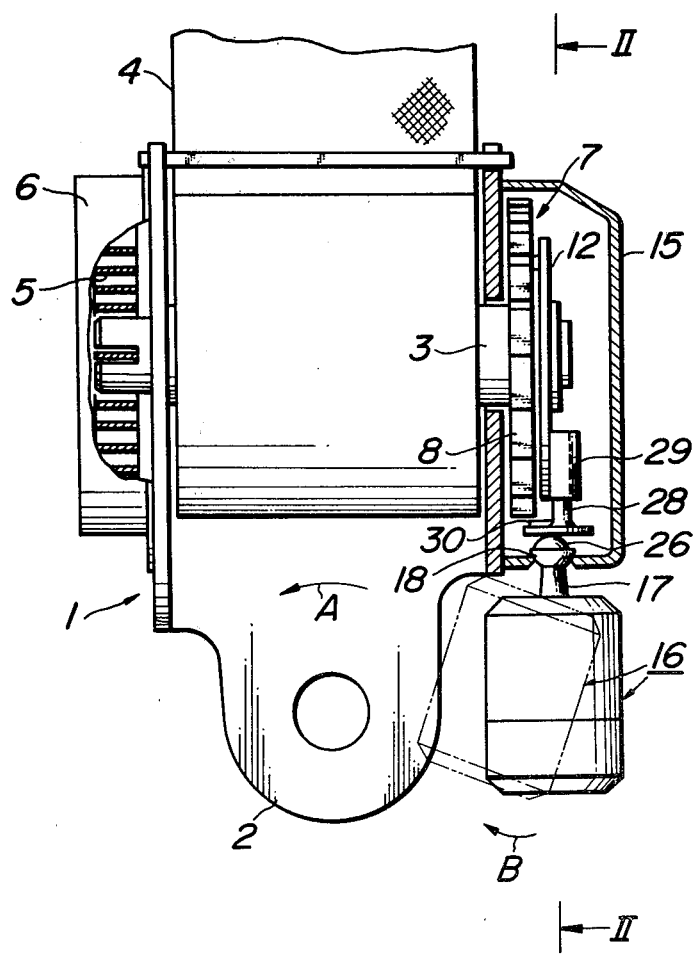
FIG. 1 is a partly-broken front view of the retractor according to one embodiment of the present invention.
Figure 2:
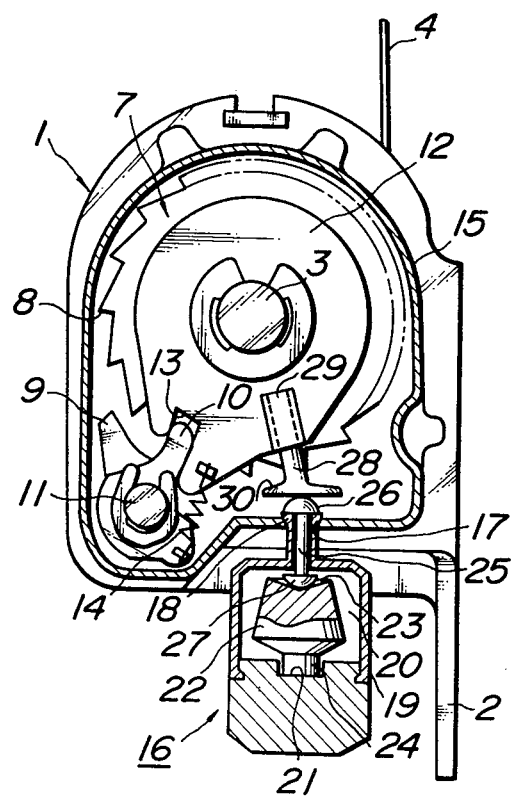
FIG. 2 is a cross-sectional view of the retractor taken along the line II—II of FIG. 1.

Referring now to FIGS. 1 and 2, there is shown an emergency lock type retractor for a passive seat belt assembly, according to a first embodiment of the present invention. The retractor includes a housing 1 having an integral bracket 2 which is to mount, by means of a bolt and nut, the housing 1 on a vehicle body, not shown. The housing 1 rotatably carries a reel 3 around which a webbing 4 forming the seat belt is wound. One axial end of the reel 3 is engaged by a spiral spring 5 which is accommodated in a cover 6 on one side of the housing 1. The spring 5 urges the reel 3 in a direction in which the belt is retracted. The other axial end of the reel 3 is provided with a ratchet wheel 7 having ratchet teeth 8 thereon. A pawl 9 adapted to engage with, or disengage from the ratchet teeth 8 is pivotably secured to the housing 1 by a pin 11 and prevents unwinding of the belt 4 from the reel 3 when the pawl 9 engages with the ratchet teeth 8. A clutch plate 12 which is formed with a recess 13 is pivoted on the reel 3 outside of the ratchet wheel 7. Thus, the clutch plate 12 is permitted to rotate relative to the reel 3. The recess 13 is engaged by a projection 10 formed integrally with the pawl 9 so that the pawl 9 is disengaged from the ratchet teeth 8 when the clutch plate 12 stays in a normal position as shown in FIG. 2. A tension spring 14 is arranged between the pawl 9 and the clutch plate 12 so as to urge the pawl 9 in a direction in which it is disengaged from the ratchet teeth 8. The housing 1 has a cover member 15 which covers the ratchet wheel 7 and the clutch plate 12. An inertia device 16 is perpendicularly suspended from the bottom surface of the cover member 15.

More particularly, the inertia device 16 includes a pendulum type first inertia member 19 having a semispherical neck portion 18 in rocking engagement with a hole 17 in the bottom wall of the cover member 15, and a second inertia member 22 which is accommodated in a chamber 20 formed in the upper portion of the first inertia member 19 and which is more sensitive, i.e. lighter in weight than the first inertia member 19. The second inertia member 22 has an upper surface 23 formed as a part-spherical recess, and a lower central projection 24 whose lower surface is flat. The projection 24 is placed on a recess 21 formed on the bottom surface of the chamber 20. As the vehicle is accelerated at a rate which is above a predetermined level, the second inertia member 22 swings earlier than the first inertia member 19 and detects the acceleration. A first slider 25 in the form of a pin has semi-spherical upper and lower ends 26 and 27 and extends axially slidably through the neck portion 18 of the first inertia member 25. The lower end 27 of the first slider 25 is supported on the part-spherical recess 23 of the second inertia member 22 so that the first slider 25 displaces upwardly as the second inertia member 22 swings with respect to the first inertia member 19. A second slider 28 is axially slidably supported by a holder 29 secured to the side surface of the clutch plate 12, and has a lower end 30 which contacts the upper end 26 of the first slider 25. The lower end 30 of the second slider 28 is formed as a claw which is adapted to engage with, or disengage from the ratchet teeth 8. The arrangement is such that, as the second slider 18 is displaced upwardly, by the first slider 25, the claw 30 engages with the ratchet teeth 8 and causes the clutch plate 12 to rotate together with the ratchet wheel 7.

With the above arrangement, as the belt 4 is unwound obliquely in a plane parallel to that of FIG. 1, the housing 1 is caused to slowly rotate about the center of the bracket 2 in a direction shown by an arrow A in FIG. 1. During this rotation of the housing 1, the inertia device 16 rotates also slowly about the neck portion 18 in a direction shown by an arrow B in FIG. 1 such that the first and the second inertia members 19 and 22 are directed perpendicularly downwards.

As the rate of acceleration or deceleration of the vehicle exceeds a predetermined level, e.g. at the time of a vehicle crash, the second inertia member 22 swings earlier than the first inertia member 19 and with respect to the latter. By this, the first slider 25 is caused to displace upwardly which in turn displaces the second slider 28 upwardly so that the claw 30 engages with the ratchet teeth 8. Consequently, the clutch plate 12 is connected with the ratchet wheel 7 through the second slider 28. In this instance, when the ratchet wheel 7 rotates counterclockwise in FIG. 2, i.e. in a direction in which the belt 4 is unwound, the clutch plate 12 rotates together with the ratchet wheel 7 and causes the projection 10 to rotate about the pin 11 clockwise in FIG. 2 against the force of the spring 14. Thus, the pawl 9 which is integral with the projection 10 engages with the ratchet teeth 8 to achieve an emergent locking of the ratchet wheel 7 and to prevent unwinding of the belt 4. Consequently, the passenger is positively restrained and protected from the accident.

Figure 3:
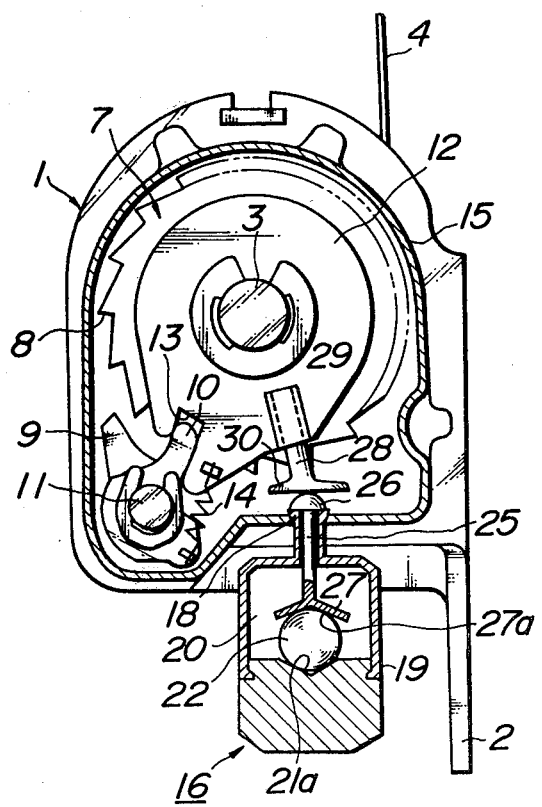
FIGS. 3 and 4 are cross-sectional views similar to FIG. 2 and showing further embodiments of the present invention.

FIG. 3 shows another embodiment of the second inertia member 22 which consists of a ball which is more sensitive than the first inertia member 19. The bottom wall of the chamber 20 in the first inertia member 19 is formed with a conical recess 21a which supports the ball 22 thereon. The lower end 27 of the first slider 25 is formed with a conical recess 27a which rests on the ball 22. The other parts are identical with those shown in FIGS. 1 and 2.

According to the embodiment of FIG. 3, as in the previous embodiment, the inertia device 16 slowly swings about the neck portion 18 following the variation of the mounting angle of the housing 1 with respect to the vehicle body, such that the device 16 is maintained in the vertical position. As the rate of acceleration or deceleration of the vehicle exceeds a predetermined level, the second inertia member formed by the ball 22 rolls on the conical recess 21a displacing the first slider 25 upwardly, and effects an emergent locking of the retractor in the same manner as in the previous embodiment. Thus, the locking function is not at all influenced by the mounting angle of the housing 1 with respect to the vehicle body.

Figure 4:
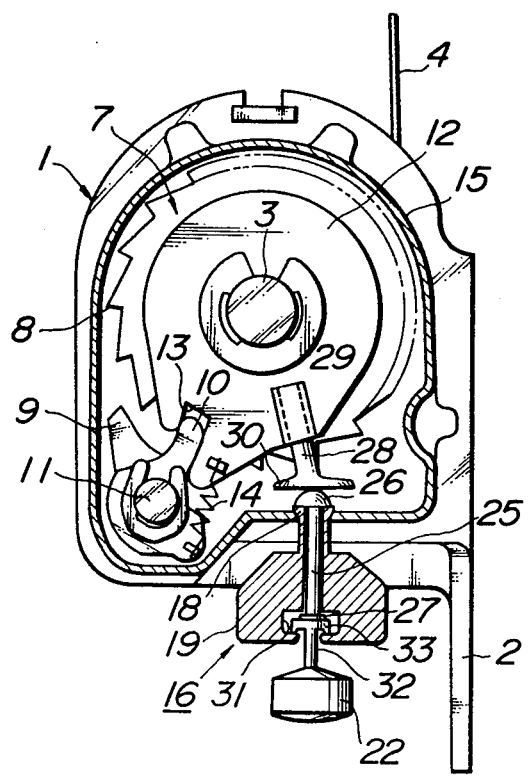

FIG. 4 shows a still further embodiment of the second inertia member 22 which is of pendulum type similar to the first inertia member 19. More particularly, the first inertia member 19 has a recess 31 at the center of its bottom surface. The second inertia member 22 is provided with an upwardly projecting rod 32 having on the upper end a flange 33 which is arranged in the recess 31 and engages with a ring-like projection on the inner periphery of the recess 31 such that the second inertia member 22 is adapted to swing with respect to the first inertia member 19. The first slider 25 extends through the first inertia member 19 and the lower end 27 of the first slider 25 is supported on the flange 33.

According to the embodiment of FIG. 4, the second inertia member 22 swings with respect to the first inertia member 19 when the rate of acceleration or deceleration of the vehicle exceeds a predetermined level. The operation and advantageous effects obtained thereby are substantially the same as those in the previous embodiments.

What is claimed is:

1. An emergency lock type retractor for a passive seat belt assembly of a vehicle including a housing mounted on a vehicle body, a reel rotatably supported by the housing and urged in a direction in which the seat belt is retracted and wound about the reel, a ratchet wheel fixedly secured to the reel, a pawl supported by the housing and normally kept disengaged from the ratchet wheel, and actuating means responsive to acceleration or deceleration of the vehicle, said actuating means establishing an engagement of the pawl with the ratchet wheel when the rate of acceleration or deceleration of the vehicle exceeds a predetermined level so as to prevent unwinding of the belt from the reel, wherein said actuating means comprises:
a first inertia member perpendicularly suspended by the housing and adapted to swing with respect to the housing as the mounting angle of the housing with respect to the vehicle body varies;
a second inertia member which is more sensitive to the acceleration or deceleration of the vehicle than the first inertia member, and which is supported by the first inertia member movably with respect to the first inertia member; and
means for transmitting to the pawl the movement of the second inertia member with respect to the first inertia member such that the pawl is displaced into engagement with the ratchet wheel, said means for transmitting the movement of the second inertia member including:
a first slider having a lower end which is in contact with a top portion of the second inertia member, the first slider being vertically slidably supported by the first inertia member such that the first slider is vertically displaced as the second inertia member moves with respect to the first inertia member, and the vertical displacement of an upper end of the first slider is transmitted to the pawl;

a clutch plate which is rotatably supported by the reel adjacent to the ratchet wheel, the clutch plate being connected to the ratchet wheel as the upper end of the first slider displaces vertically upwards to thereby engage the pawl with the ratchet wheel; and a second slider having a lower end which is in contact with the upper end of the first slider, the second slider being supported by the clutch plate radially slidably with respect thereto and provided with a claw, the second slider being displaced radially inwards with respect to the clutch plate as the first slider displaces vertically upwards such that the claw is engaged with the ratchet wheel to connect the clutch plate with the ratchet wheel.

2. The retractor as claimed in claim 1, wherein the first inertia member defines therein a chamber whose bottom wall is formed with a recess having a flat surface, the second inertia member having a flat bottom surface and being placed on the flat surface of the recess.

3. The retractor as claimed in claim 1, wherein the first inertia member defines therein a chamber whose bottom wall is formed with a conical recess, the second inertia member consisting of a ball and being placed on the conical surface of the recess.

4. The retractor as claimed in claim 1, wherein the second inertia member is of pendulum type and is suspended by the first inertia member.

5. The retractor as claimed in claim 1, wherein said means to transmit the movement of the second inertia member further includes a projection which is integral with the pawl and engaged by the clutch plate.

* * * * *